United States Patent
Bergo et al.

(10) Patent No.: US 12,506,402 B2
(45) Date of Patent: Dec. 23, 2025

(54) POWER CONVERTER CIRCUIT WITH SMART FILTER FOR IDENTIFYING FAULTS

(71) Applicant: Infineon Technologies AG, Neubiberg (DE)

(72) Inventors: Michele Bergo, Padua (IT); Dario Cappuzzo, Limena (IT)

(73) Assignee: Infineon Technologies AG, Neubiberg (DE)

( * ) Notice: Subject to any disclaimer, the term of this patent is extended or adjusted under 35 U.S.C. 154(b) by 474 days.

(21) Appl. No.: 18/188,886

(22) Filed: Mar. 23, 2023

(65) Prior Publication Data
US 2024/0322671 A1 Sep. 26, 2024

(51) Int. Cl.
*H02M 1/32* (2007.01)
*H02M 3/00* (2006.01)
*H02M 3/156* (2006.01)

(52) U.S. Cl.
CPC ........... *H02M 1/32* (2013.01); *H02M 3/01* (2021.05); *H02M 3/156* (2013.01)

(58) Field of Classification Search
CPC ........... H02M 1/32; H02M 3/01; H02M 3/156
See application file for complete search history.

(56) References Cited

U.S. PATENT DOCUMENTS

| | | | |
|---|---|---|---|
| 6,778,111 B1* | 8/2004 | Zhu | H04L 25/08 341/134 |
| 7,397,292 B1* | 7/2008 | Potanin | H03K 5/1252 327/552 |
| 8,184,206 B2* | 5/2012 | Magnusen | H03G 1/0088 348/720 |
| 2018/0358891 A1* | 12/2018 | Diotte | H02M 1/32 |

OTHER PUBLICATIONS

"ISO 26262", Wikipedia, the free encyclopedia, Retrieved from: https://en.wikipedia.org/wiki/ISO_26262, Accessed on: Feb. 15, 2023, 8 pp.

* cited by examiner

*Primary Examiner* — Rafael O De Leon Domenech
(74) *Attorney, Agent, or Firm* — Shumaker & Sieffert, P.A.

(57) ABSTRACT

This disclosure describes a filter circuit for a power converter circuit. The filter circuit may comprise a comparator circuit configured to determine when a switch node voltage of the power converter circuit satisfies a voltage threshold, and a deglitch circuit configured to determine whether the switch node voltage satisfying the threshold is expected based on control signals to the power converter circuit or attributable to a situation of ringing on an inductor of the power converter circuit. The filter circuit may be configured to output a fault in response to both the comparator circuit determining that the switch node voltage of the power converter circuit satisfies the voltage threshold and the deglitch circuit determining that the switch node voltage satisfying the threshold is not expected based on the control signals and not attributable to the situation of ringing on the inductor of the power converter circuit.

17 Claims, 10 Drawing Sheets

POWER CONVERTER CIRCUIT WITH SMART FILTER FOR IDENTIFYING FAULTS

TECHNICAL FIELD

This disclosure relates to power converters, and more particularly, DC-to-DC boost converters.

BACKGROUND

Power converter circuits are used in a wide variety of direct current (DC) power settings to provide a stepped-up or stepped down voltage. Power converter circuits that provide a stepped-up DC voltage are commonly referred to as DC/DC boost converters, and they are commonly used in wide variety of devices and systems.

Often, power converter circuits operate in devices or systems that have safety concerns. For example, when used in automobiles, power converter circuits may need to comply with safety standards, such as those defined in the Automotive Safety Integrity Level (ASIL) risk classification scheme. The ASIL risk classification scheme is defined by the ISO 26262 standard entitled "Functional Safety for Road Vehicles." In these and other settings, it is desirable to ensure that power converter circuits operate properly and safely.

SUMMARY

This disclosure describes a smart filter for a power converter circuit. The smart filter may be configured to identify situations of fault based on a switch node voltage in the power converter circuit relative to expectations defined by control signals, such as pulse width modulation (PWM) signals. However, merely monitoring the switch node voltage relative to basic control signal expectations is not necessarily sufficient to accurately determine faults, because ringing on an inductor of a power converter circuit may cause the switch node voltage to oscillate in a way that may be indicative of a fault when no fault actually exists. Therefore, the smart filter described herein is configured to identify and distinguish situations where ringing is expected and situations where ringing is not expected. In this way, the smart filter can improve fault detection in power converters for a variety of situations and operational modes.

In one example, this disclosure describes a filter circuit for a power converter circuit. The filter circuit comprises a comparator circuit configured to determine when a switch node voltage of the power converter circuit satisfies a voltage threshold; and a deglitch circuit configured to determine whether the switch node voltage satisfying the threshold is expected based on control signals to the power converter circuit or attributable to a situation of ringing on an inductor of the power converter circuit. The filter circuit is configured to output a fault in response to both the comparator circuit determining that the switch node voltage of the power converter circuit satisfies the voltage threshold and the deglitch circuit determining that the switch node voltage satisfying the threshold is not expected based on the control signals and not attributable to the situation of ringing on the inductor of the power converter circuit.

In another example, this disclosure describes a power converter circuit comprising: an inductor-capacitor (LC) circuit connected to a voltage source; a power switch, wherein an ON/OFF state of the power switch is controlled to define a switch node voltage at a switch node located within the LC circuit; and filter circuit for the power converter circuit. The filter circuit comprises a comparator circuit configured to determine when the switch node voltage of the power converter circuit satisfies a voltage threshold; and a deglitch circuit configured to determine whether the switch node voltage satisfying the threshold is expected based on control signals to the power converter circuit or attributable to a situation of ringing on an inductor of the power converter circuit. The filter circuit is configured to output a fault in response to both the comparator circuit determining that the switch node voltage of the power converter circuit satisfies the voltage threshold and the deglitch circuit determining that the switch node voltage satisfying the threshold is not expected based on the control signals and not attributable to the situation of ringing on the inductor of the power converter circuit.

In another example, this disclosure describes a method that comprises receiving control signals at a power converter circuit; operating the power converter circuit based on the control signals; determining when a switch node voltage of the power converter circuit satisfies a voltage threshold; determining whether the switch node voltage satisfying the threshold is attributable to a situation of ringing on an inductor of the power converter circuit; and outputting a fault associated with the power converter circuit in response to determining that the switch node voltage of the power converter circuit satisfies the voltage threshold and in response to determining that the switch node voltage satisfying the threshold is not expected based on the control signals and not attributable to the situation of ringing on the inductor of the power converter circuit.

Details of these and other examples are set forth in the accompanying drawings and the description below. Other features, objects, and advantages will be apparent from the description and drawings, and from the claims.

DETAILED DESCRIPTION

This disclosure describes a smart filter for a power converter circuit, power converter circuits that use the smart filter, and methods of operating a power converter circuit. The smart filter of the power converter circuit may be configured to identify situations of fault based on a switch node voltage in the power converter circuit relative to expectations defined by control signals, such as pulse width modulation signals applied to a power switch of the power converter circuit. However, merely monitoring the switch node voltage relative to basic control signal expectations is not necessarily sufficient to accurately determine faults, because ringing on an inductor of a power converter circuit may cause the switch node voltage to oscillate in a way that may be indicative of a fault when no fault actually exists. Therefore, the smart filter described herein is configured to identify and distinguish situations where ringing is expected and situations where ringing is not expected. In this way, the smart filter can improve fault detection in power converters for a variety of situations and operational modes.

In power distribution systems, as in the automotive field, a boost converter (e.g., a step-up converter) can be used to rise up a pre-regulator output voltage (e.g., from a buck converter) in conditions specified, for example in the ISO 16750-2 standard (starting profiles) thereby satisfying full system operations. Power switches (or other elements) in boost converters, however, can potentially fail, possibly leading to short circuit conditions or open circuit conditions. In most situations, the failure of a power switch in a short circuit condition is more critical relative to an open circuit condition, especially in systems that require high levels of safety. A short circuit condition, for example, can sometimes lead to destructive high current to flow into the system. A short circuit condition can occur during boost operations when a power switch is intended to open and close at a defined switching frequency. Another short circuit situation can occur if the inductor of the boost converter is shorted, possibly causing destructive current to flow on the power switch the power switch is in the ON state. A robust solution is desirable, in order to detect and signal such fault conditions during run time for all possible boost operating modes. e.g., pulse skipping mode, discontinuous conduction mode (DCM), and continuous conduction mode (CCM).

Figure 1:
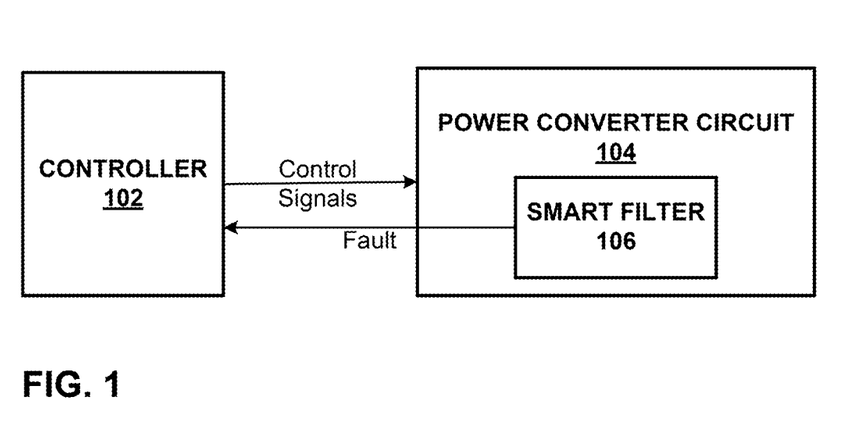
FIG. 1 is a block diagram of an example circuit or system that includes a controller and a power converter circuit.

FIG. 1 is a block diagram of an example circuit or system 100 that includes a controller 102 and a power converter circuit 104. Controller 102 may comprise a processor, e.g., a microprocessor, that sends control signals to one or more power switches (not shown in FIG. 1) that operate within power converter circuit 104. The control signals may comprise ON/OFF commands that define pulse width modulation (PWM) signals or may comprise the PWM signals. Power converter circuit 104 may comprise a boost converter that includes an inductor-capacitor (LC) circuit (not shown in FIG. 1). By controlling the ON/OFF state of a power switch, power converter 104 can be configured to charge its capacitor of its LC circuit to achieve a step-up in voltage on the capacitor.

According to this disclosure, power converter circuit 104 includes a smart filter 106, e.g., a filter circuit for power converter circuit 104. Smart filter 106 may be configured to identify situations of fault based on a switch node voltage in the power converter circuit 106 relative to expectations defined by control signals from controller 102. The control signals may include pulse width modulation signals applied to a power switch of the power converter circuit 104. Moreover, smart filter 106 is further configured to identify and distinguish situations where ringing on an inductor of power converter 104 is expected and situations where ringing on the inductor is not expected. In this way, smart filter 106 can improve fault detection in power converter circuit 104 for a variety of situations and operational modes.

Figure 2:
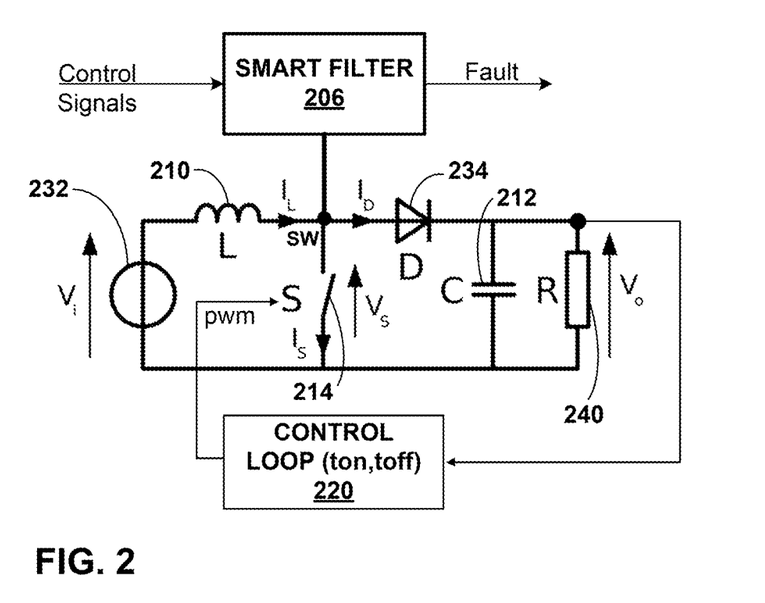
FIG. 2 is a diagram showing an example power converter circuit with a smart filter configured to operate according to this disclosure.

FIG. 2 is another diagram, depicting an example power converter circuit with a smart filter 206 configured to operate according to this disclosure. The power converter circuit shown in FIG. 2 may include a voltage source 232 connected to an LC circuit (e.g., inductor 210 and capacitor 212. A blocking diode 234 may be included to block any backwards current flow from capacitor 212. Blocking diode 234 may comprise a passive diode or so-called active diode (i.e., a transistor with a body diode that operates as a blocking diode when the transistor is turned OFF). The power converter may be connected to a load, e.g., shown as resistor 240. One or more power switches (represented as power switch 214) are controlled via a regulation control loop 220, which uses ON/OFF commands (ton, toff) to define PWM signals applied to the gate of power switch 214. The PWM signals define the ON/OFF state of power switch 214 for charging (i.e., boosting) the voltage on capacitor 212 relative to a supply voltage from voltage source 232.

Similar to the example shown in FIG. 1, the power converter circuit of FIG. 2 includes a smart filter 206 positioned at a so-called switch node (SW) of the power converter circuit. Smart filter 206 comprises a filter circuit for power converter circuit 104 that may be configured to identify situations of fault based on a switch node voltage in the power converter circuit relative to expectations defined by control signals (e.g., Ton Toff, and/or PWM signals) from a microcontroller, e.g., a processor. Smart filter 206 is configured to identify and distinguish situations where ringing on inductor 210 is expected and situations where ringing on inductor 210 is not expected. Upon identifying a fault, after filtering to exclude false positive situations attributable to ringing on inductor 210, smart filter 206 may issue a fault signal to a controller. The controller, in turn, may be configured to limit or disable operation of the power converter circuit in response to receiving the fault signal from smart filter 206. Smart filter 206 can improve fault detection in the power converter circuit for a variety of situations and operational modes.

Figure 3:
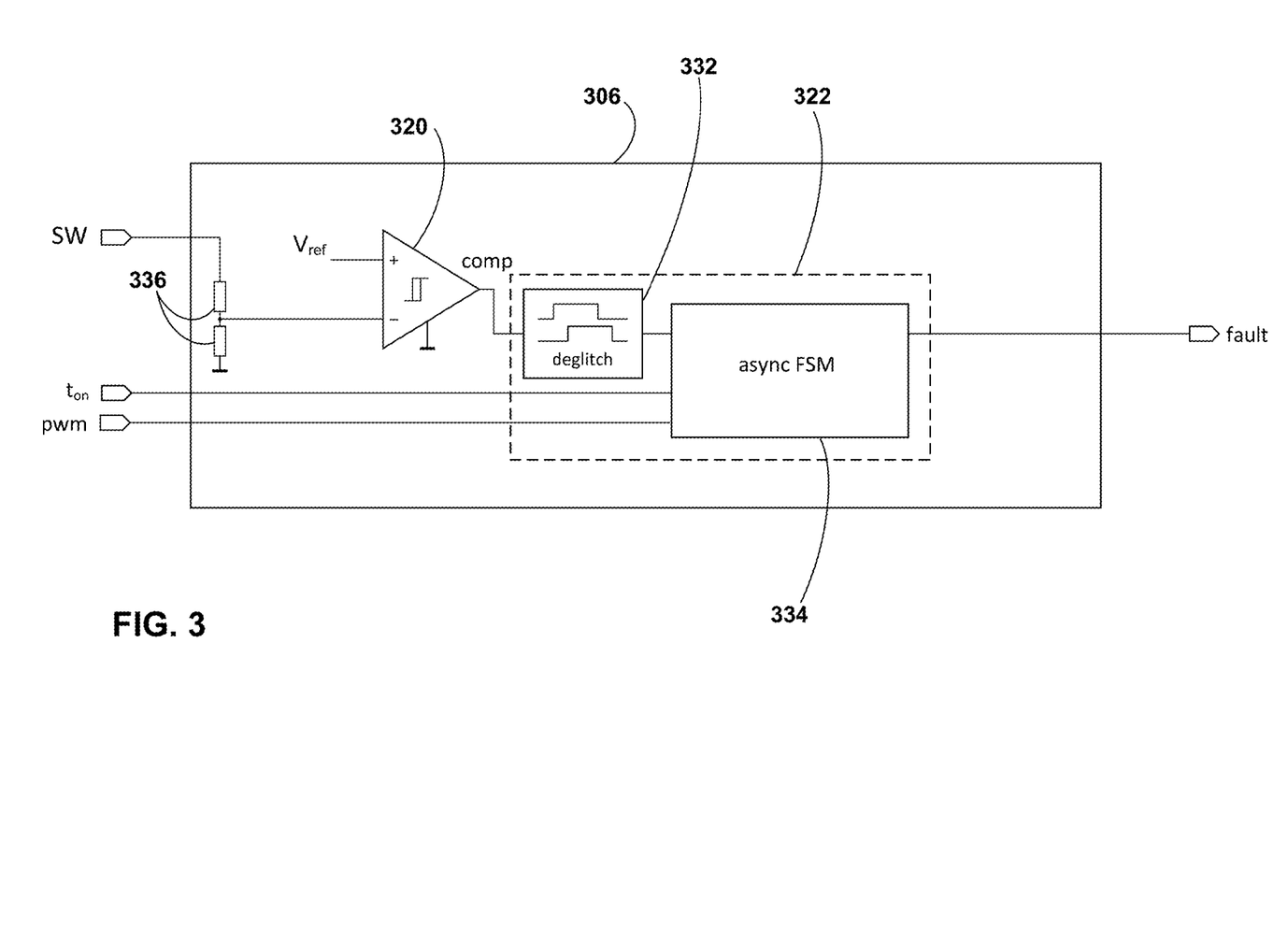
FIG. 3 is a circuit and block diagram showing an example of a filter circuit of a power converter circuit consistent with this disclosure.

FIG. 3 is a circuit and block diagram showing an example of a filter circuit 306 of a power converter circuit consistent with this disclosure. Filter circuit 306 may correspond to smart filter 106 of FIG. 1 or smart filter 206 of FIG. 2. As shown in FIG. 3, filter circuit 306 includes a comparator circuit 320, which may be configured to determine when a switch node voltage of the power converter circuit satisfies a voltage threshold. In this example, the voltage threshold is shown as Vref. Moreover, in this example, a voltage divider 336 is included to reduce the actual switch node voltage (SW) to a lower level for the comparison. Voltage divider 336 is not required, but it can help to reduce or simplify comparator circuit 320 to operate at lower voltages.

Filter circuit 306 may further comprise a deglitch circuit 322 configured to determine whether the switch node voltage satisfying the threshold is expected based on control signals to the power converter circuit or attributable to a situation of ringing on an inductor of the power converter circuit. According to this disclosure, filter circuit 306 may be configured to output a fault in response to both the comparator circuit 320 determining that the switch node voltage of the power converter circuit satisfies the voltage threshold and the deglitch circuit 322 determining that the switch node voltage satisfying the threshold is not expected based on the control signals and not attributable to the situation of ringing on the inductor of the power converter circuit.

In the example shown in FIG. 3, deglitch circuit 322 includes a deglitch filter 332 and an asynchronous finite state machine (async FSM 334). In this case, async FSM 334 may be configured to output a fault signal in response to comparator circuit 320 determining that the switch node voltage of the power converter circuit satisfies the voltage threshold and the deglitch filter 332 determining that the switch node voltage satisfying the threshold is not expected based on the control signals and is not attributable to the situation of ringing on the inductor of the power converter circuit. In some examples, async FSM 334 is configured to determine whether the switch node voltage satisfying the threshold is either attributable or not attributable to the situation of ringing on the inductor of the power converter circuit based on the control signals to the power converter circuit. For example, the control signals may define either a first situation or a second situation. Ringing on the inductor may be expected when the control signals define the first situation and ringing on the inductor may not be expected when the control signals define the second situation. The situations may depend on the operating mode of the power converter, e.g., continuous conduction mode (CCM), discontinuous conduction mode (DMC) or pulse skipping mode. Ringing on the inductor often occurs in DCM and pulse skipping mode, but ringing does not typically occur in CCM.

As described in greater detail below, in order to determine that the switch node voltage of the power converter circuit satisfies the voltage threshold and that the switch node voltage satisfying the threshold is not expected based on the control signals and not attributable to the situation of ringing on the inductor of the power converter circuit, FSM 334 may be configured to identify whether certain conditions are satisfied. For example, in response to comparator circuit 320 determining that the switch node voltage of the power converter circuit satisfies the voltage threshold, async FSM 334 may be configured output the fault signal in response to at least one of the following conditions being satisfied:
(1) the control signals define at least one high-to-low transition within a power converter cycle, wherein the power converter cycle occurs with a pre-defined period of time; or
(2) the control signals define a low state at a beginning of the power converter cycle.

In this case, if at least one of these conditions are satisfied, and in response to comparator circuit 320 determining that the switch node voltage of the power converter circuit satisfies the voltage threshold, then filter circuit 306 may output a fault signal. In some examples, determining whether either of the conditions above are satisfied may take a short amount of time, e.g., one or two power converter cycles, depending upon the situation, which provides a very fast response time that can help to ensure that any short circuits in a power converter are identified in a quick and safe manner.

Referring now to both FIGS. 1 and 2, $t_{on}$ and $t_{off}$ signals (which may also be labeled bst_on and bst_off signals) are used by control loop 220 the boost the output of the power converter and to generate a PMW signal (also called the bst_pwm signal) for controlling the ON/OFF state of power switch 214. Filter circuit 306 (e.g., an example of smart filter 206) may comprise a comparator 320 with hysteresis for monitoring a scaled down version of the switching node (SW) of the boost converter, which is also referred to in logic diagrams below as a "bsti" signal. Comparator 302 may be set to high when the scaled version of the switch node voltage is below a threshold Vref.

Async FSM 334 can be used to check the consistency of the switching node voltage level with expectations defined by the three control signals mentioned above (e.g., Ton, Toff, and PWM) since the switch node can sometimes experience voltage oscillations (referred to as ringing) due to current flow in inductor 210. In this way, async FSM 334 can achieve better switch node monitoring that can account for expectations on the switch node (e.g., expectations based on control signals $t_{on}$ and $t_{off}$ and PWM).

Figure 4:
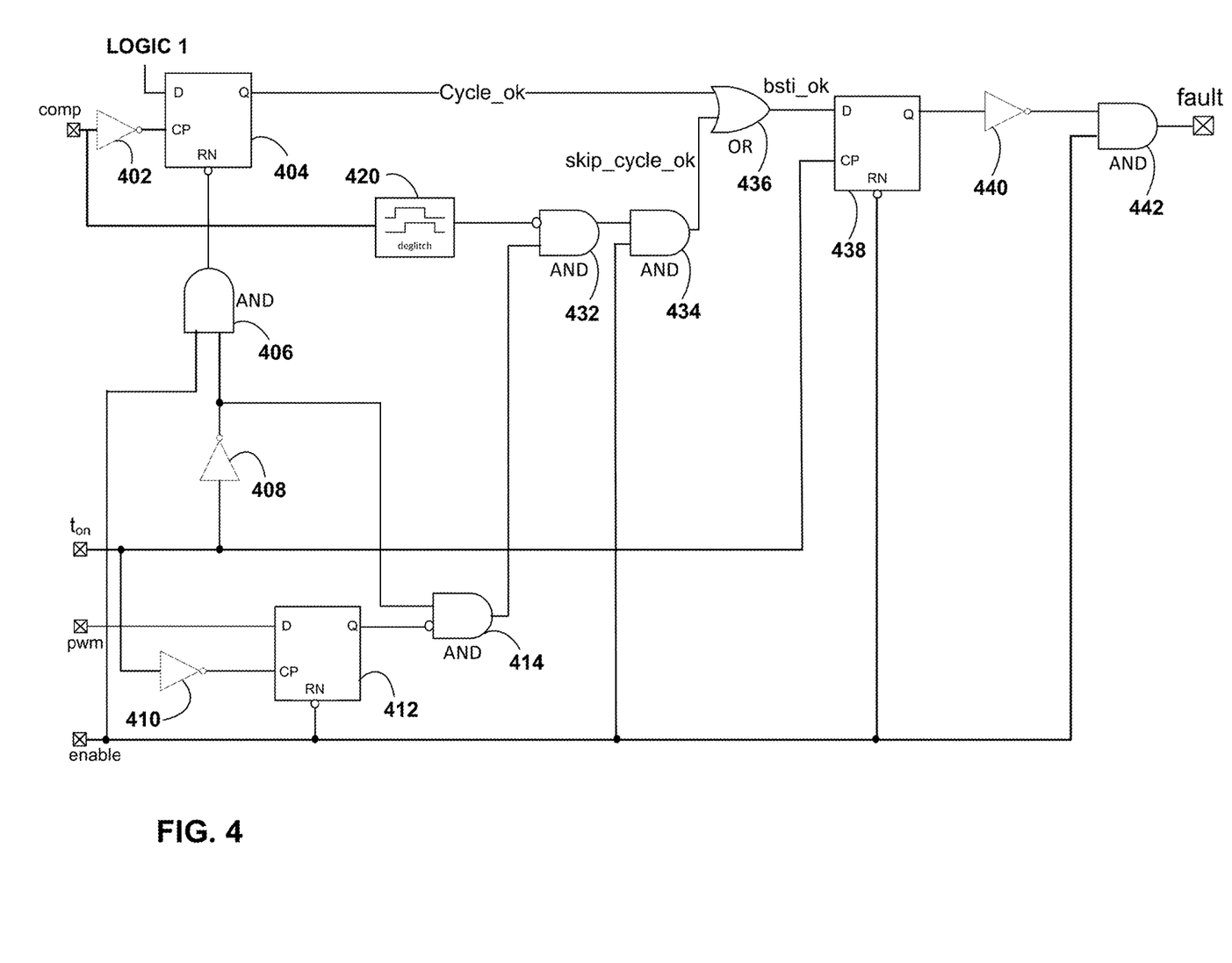
FIG. 4 is a conceptual circuit diagram showing example logic that may be implemented within a smart filter of a power converter circuit consistent with this disclosure.

FIG. 4 is a conceptual circuit diagram showing example logic that may be implemented within a smart filter of a power converter circuit consistent with this disclosure. FIG. 4 generally illustrates one example of how an async FSM can be implemented. The circuit of FIG. 4 is generally checking that at least one of these conditions are fulfilled during a time window between 2 rising edges of the Ton signals:
1. the BSTI comparator have at least one high to low transition; or
2. the BSTI comparator is already low at the beginning of cycle (BSTI signal being high assures that the circuit is not currently in a short circuit)

Then, the status (the OR of these 2 conditions sampled) is reset at next rising edge of ton. A worst-case fault detection time is merely 2 switching periods, which is very fast.

Functionally, consistent with the logic diagram of FIG. 4, a boost pwm is sampled at every cycle on the falling edge of the Ton and 2 situations can occur:
pwm high→normal cycle (the information is kept (latched) till the ton rising edge)
pwm low→skip cycle (the information is kept (latched) till the ton rising edge)

If the boost is in a normal cycle (during an observation window) a high to low transition of a received comparator signal (comp) is expected (in case there is no fault=short to ground). If a high to low transition is not seen→bsti_ok=0→undervoltage is detected (indicating fault). If the boost is in a skip cycle (again, during an observation window) the comparator signal (comp) is deglitched in this case to prevent a false triggering to the LC resonance in skip mode or DCM, and is expected to stay low. If the level of the comparator signal (comp) is changing to high→bsti_ok=0→undervoltage detected. A worst case of fault detection delay is 2 Ton periods, because it could happen that during a skip cycle (therefore the cycle is set as "ok" already at the beginning since BSTI is high) the fault occurs, and therefore, the circuit must wait until the end of the next cycle to set the fault.

The logic in FIG. 4 is configured to receive an enable signal (enable), a pwm signal (pwm), an ON signal (Ton) and a comparator signal (comp), e.g., from comparator 320 of FIG. 3. The logic may be arranged in other ways to achieve the same functionality explained above, and the arrangement shown in FIG. 4 is merely one example. The example shown in FIG. 4 includes various logic elements that operate with deglitch filter 420, which may correspond to deglitch filter 332 of FIG. 3. The various logic elements include memory elements 404, 412, 438, e.g., flip-flop circuits for storing and holding the state of various signals. For example, memory elements 404, 412, 438 may receive inputs D, CP, and RN, where D may represent data, CP may represent a clocking signal, and RN may represent a reset signal. An inverter (e.g., NOT logic shown as a small circle positioned at the RN input) may invert the logic signals at the RN inputs. Q represents the output and Q is logic 1 when D and CP are logic 1. The RN input resets the memory element when the input coming to the inverter at the RN is zero (which gets inverted at the RN input to logic 1). Logic elements of the example in FIG. 4 may also include NOT gates 402, 408, 410, and 440. Logic elements of the example in FIG. 4 may also include AND gates 406, 414, 432, 434, and 442. The circles illustrated at the inputs to various AND gates 414 and 432 and memory circuits 404, 412, 438 may indicate inverters that invert (high to low, or low to high) the input logic signal at those inputs. The output of the logic circuit of FIG. 4 is a fault signal that is set to high if the fault conditions described herein are satisfied.

FIGS. 5-10 are timing diagrams of signals, which illustrate various situations for fault detection, including some situations attributable to ringing on an inductor of a power converter circuit and some situations that are not attributable to ringing on the inductor. In each of FIGS. 5-10, example signals values are shown for control signals Ton, Toff, and PWM. Referring again to FIG. 2, the Ton and Toff signals refers to control signal from a processor configured to turn power switch 214 ON and OFF as part of control loop 220. The PWM signal refers to the gate control signal applied to power switch 214, which is generated based on the Ton and Toff signals in control loop 220. The "SW" signal in each of FIGS. 5-10 shows the voltage level on the switch node (SW) of FIG. 2, e.g., relative to a dotted line that represents, e.g., Vref input to comparator 320 shown in FIG. 3. The "comp" signal in each of FIGS. 5-10, e.g., refers to the output of comparator 320 of FIG. 3. The "fault" signal in each of FIGS. 5-10, e.g., refers to the "fault" output shown in FIG. 1, FIG. 2, FIG. 3, or FIG. 4.

Figure 5:
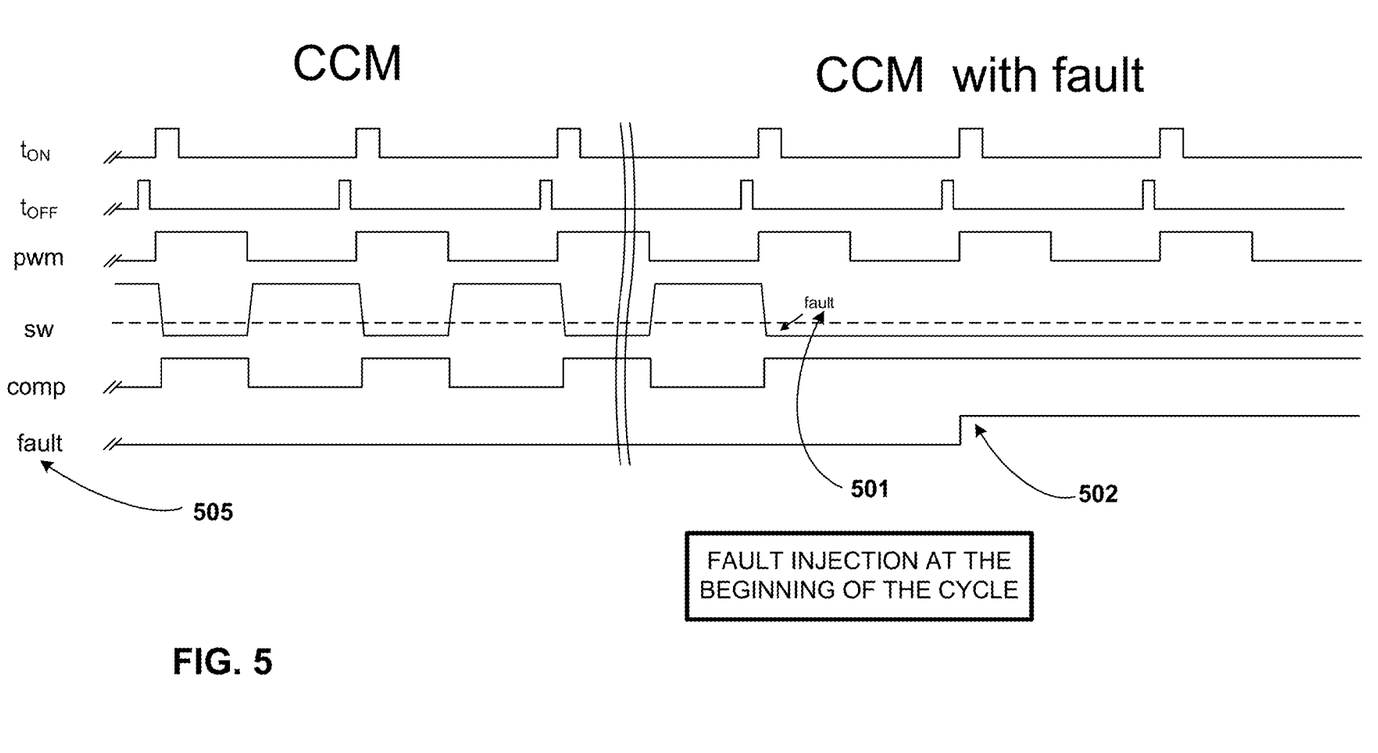
FIGS. 5-10 are timing diagrams of signals, which illustrate various situations for fault detection, including some situations attributable to ringing on an inductor of a power converter circuit and some situations that are not attributable to ringing on the inductor.

FIG. 5 illustrates signals during operation of a boost converter in continuous conduction mode (CCM) in non-fault conditions (on the left) and CCM in the presence of a fault that occurs at the beginning of a switching cycle (on the right). On the left, whenever the comp signal is high (indicating a potential fault), the comp signal going high is attributable to the expectations caused by Ton, Toff, and PWM. On the right, however, at the location of fault injection 501, an actual fault is introduced, which is not attributable to the expectations caused by Ton, Toff, and PWM and not attributable to ringing on an inductor. This is confirmed because the control signals Ton, Toff, and PWM define a low state at a beginning of the power converter cycle. Thus, at point 502, since the comp signal remains high, an actual fault signal 505 is output by the filter circuit at the end of the current switching cycle. In this case, the fault the power converter circuit satisfies the voltage threshold (e.g., as determined by comparator 320) and deglitch circuit 322 determines that the switch node voltage satisfying the threshold is not expected based on the control signals and not attributable to the situation of ringing on the inductor of the power converter circuit.

Figure 6:
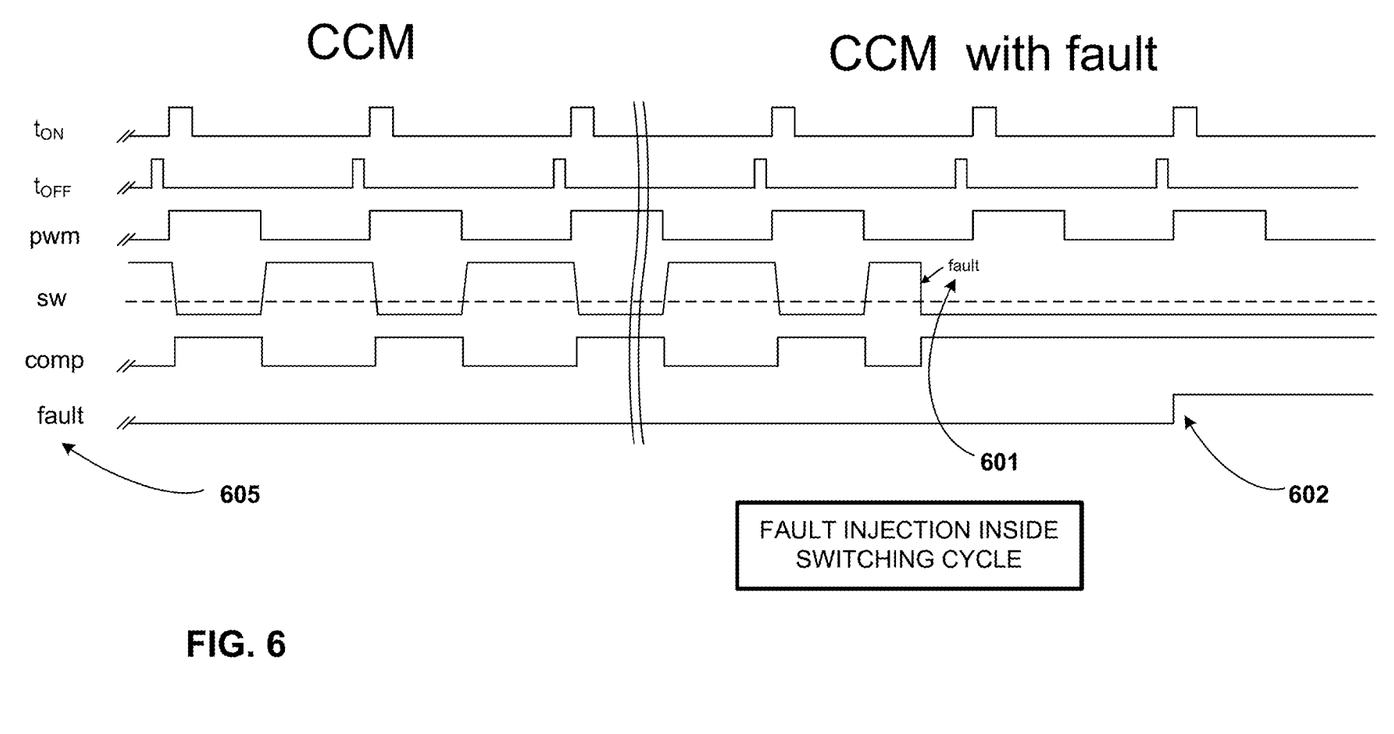

FIG. 6 illustrates signals during operation of a boost converter in CCM in non-fault conditions (on the left) and CCM in the presence of a fault that occurs inside of a switching cycle (on the right). On the left, whenever the comp signal is high (indicating a potential fault), the comp signal going high is attributable to the expectations caused by Ton, Toff, and PWM. On the right, however, at the location of fault injection 601, an actual fault is introduced at the inside of a switching cycle, which is not attributable to the expectations caused by Ton, Toff, and PWM and not attributable to ringing on an inductor. This is confirmed, because the control signals Ton, Toff, and PWM then define at least one high-to-low transition within the next power converter cycle that occurs with a pre-defined period of time (e.g., a defined time period long enough to capture the next power converter cycle). Thus, at point 602, since the comp signal remains high, an actual fault signal 605 is output by the filter circuit following the next complete switching cycle after the fault is introduced. In this case, the fault the power converter circuit satisfies the voltage threshold (as determined by comparator 320) and deglitch circuit 322 determines that the switch node voltage satisfying the threshold is not expected based on the control signals and not attributable to the situation of ringing on the inductor of the power converter circuit.

Figure 7:
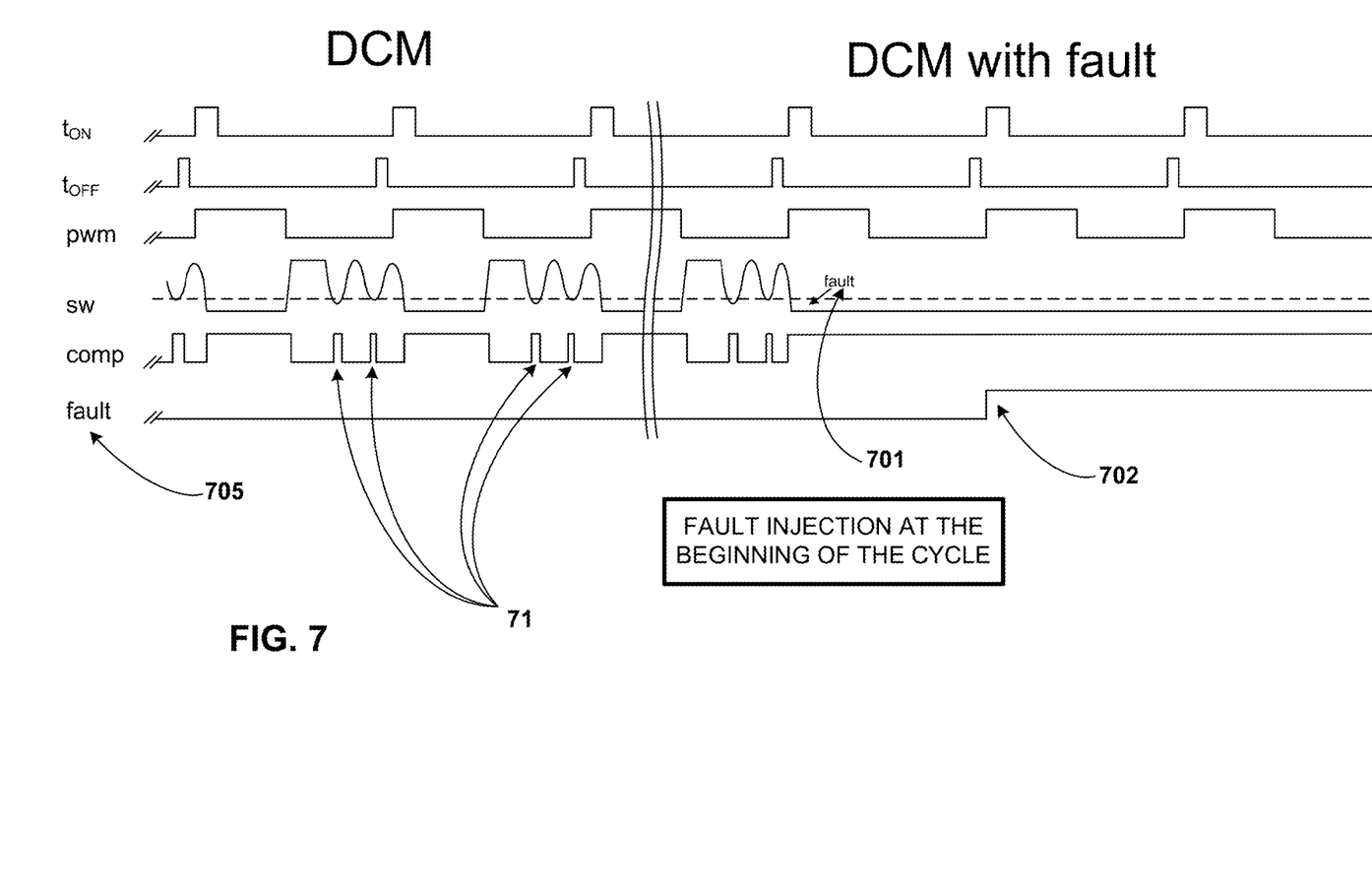

FIG. 7 illustrates signals during operation of a boost converter in discontinuous conduction mode (DCM) in non-fault conditions (on the left) and DCM in the presence of a fault that occurs at the beginning of a switching cycle (on the right). On the left, whenever the comp signal is high (indicating a potential fault), the comp signal going high is attributable to the expectations caused by Ton, Toff, and PWM (except at points 71). At points 71, however, the comp signal going high is attributable to ringing on the inductor, which is expected in DCM mode following a PWM pulse. In this case, deglitch circuit 322 determines that the high comp signals at points 71 are attributable to ringing on the inductor and points 71 do not cause a fault signal even though the comp signal is high for part of the cycle. Moreover, in this case, since comp signal at points 71 does not remain high at the end of that switching cycle, no fault is determined based on the signals at point 71. On the right, however, at the location of fault injection 701, an actual fault is introduced, which is not attributable to the expectations caused by Ton, Toff, and PWM and not attributable to ringing on an inductor. This is confirmed because the control signals Ton, Toff, and PWM define a low state at a beginning of the power converter cycle. Thus, at point 702, since the comp signal remains high, an actual fault signal 705 is output by the filter circuit at the end of the current switching cycle. In this case, the fault the power converter circuit satisfies the voltage threshold (e.g., as determined by comparator 320) and deglitch circuit 322 determines that the switch node voltage satisfying the threshold is not expected based on the control signals and not attributable to the situation of ringing on the inductor of the power converter circuit.

Figure 8:
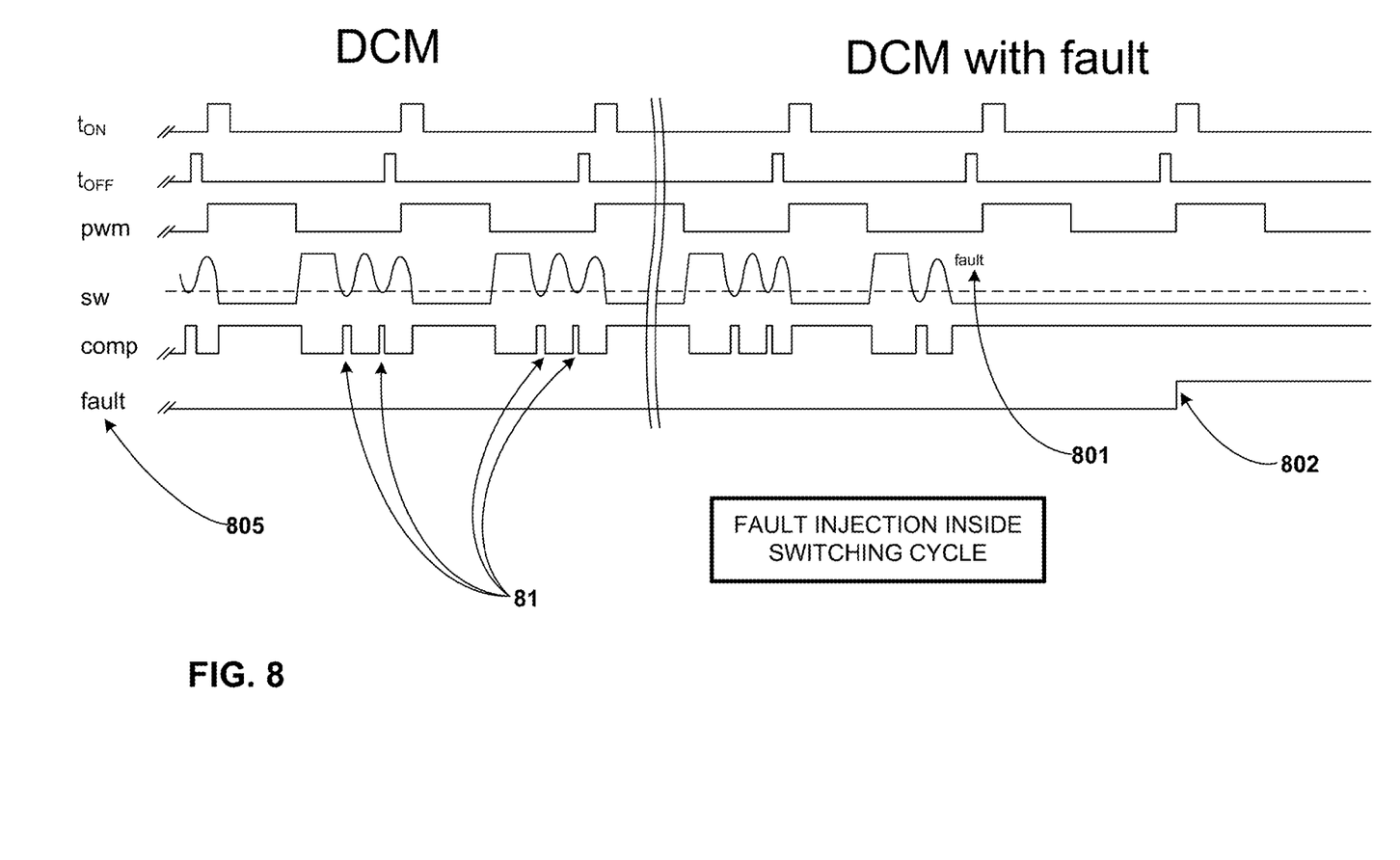

FIG. 8 illustrates signals during operation of a boost converter in DCM in non-fault conditions (on the left) and DCM in the presence of a fault that occurs inside of a switching cycle (on the right). On the left, whenever the comp signal is high (indicating a potential fault), the comp signal going high is attributable to the expectations caused by Ton, Toff, and PWM (except at points 81). At points 81, however, the comp signal going high is attributable to ringing on the inductor, which is expected in DCM mode following a PWM pulse. In this case, deglitch circuit 322 determines that the high comp signals at points 81 are attributable to ringing on the inductor and points 81 do not cause a fault signal even though the comp signal is high for part of the cycle. Moreover, in this case, since comp signal at points 81 does not remain high at the end of that switching cycle, no fault is determined based on signals at points 81. On the right, however, at the location of fault injection 801, an actual fault is introduced at the inside of a switching cycle, which is not attributable to the expectations caused by Ton, Toff, and PWM and not attributable to ringing on an inductor. This is confirmed because the control signals Ton, Toff, and PWM then define at least one high-to-low transition within the next power converter cycle that occurs with a pre-defined period of time (e.g., a defined time period long enough to capture the next power converter cycle). Thus, at point 802, since the comp signal remains high, an actual fault signal 805 is output by the filter circuit following the next complete switching cycle after the fault is introduced. In this case, the fault the power converter circuit satisfies the voltage threshold (as determined by comparator 320) and deglitch circuit 322 determines that the switch node voltage satisfying the threshold is not expected based on the control signals and not attributable to the situation of ringing on the inductor of the power converter circuit.

Figure 9:
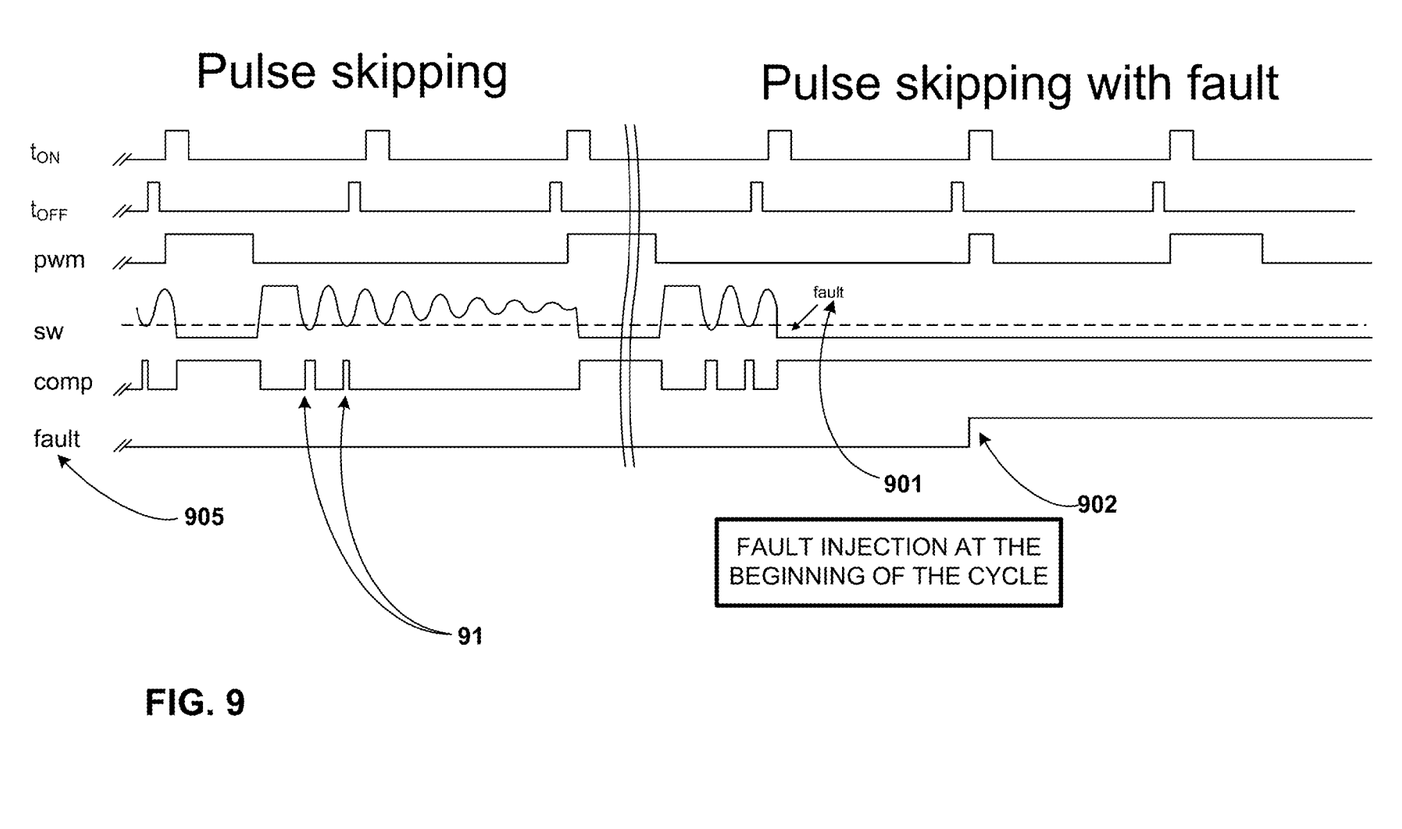

FIG. 9 illustrates signals during operation of a boost converter in pulse skipping mode in non-fault conditions (on the left) and pulse skipping mode in the presence of a fault that occurs at the beginning of a switching cycle (on the right). On the left, whenever the comp signal is high (indicating a potential fault), the comp signal going high is attributable to the expectations caused by Ton, Toff, and PWM (except at points 91). At points 91, however, the comp signal going high is attributable to ringing on the inductor, which is expected in pulse skipping mode following the most recent PWM pulse. In this case, deglitch circuit 322 determines that the high comp signals at points 91 are attributable to ringing on the inductor and points 91 do not cause a fault signal even though the comp signal is high for part of the cycle. Moreover, in this case, since comp signal at points 91 does not remain high at the end of that switching cycle, no fault is determined based on the signals at point 91. On the right, however, at the location of fault injection 901, an actual fault is introduced, which is not attributable to the expectations caused by Ton, Toff, and PWM and not attributable to ringing on an inductor. This is confirmed because the control signals Ton, Toff, and PWM define a low state at a beginning of the power converter cycle. Thus, at point 902, since the comp signal remains high, an actual fault signal 905 is output by the filter circuit at the end of the current switching cycle. In this case, the fault the power converter circuit satisfies the voltage threshold (e.g., as determined by comparator 320) and deglitch circuit 322 determines that the switch node voltage satisfying the threshold is not expected based on the control signals and not attributable to the situation of ringing on the inductor of the power converter circuit.

Figure 10:
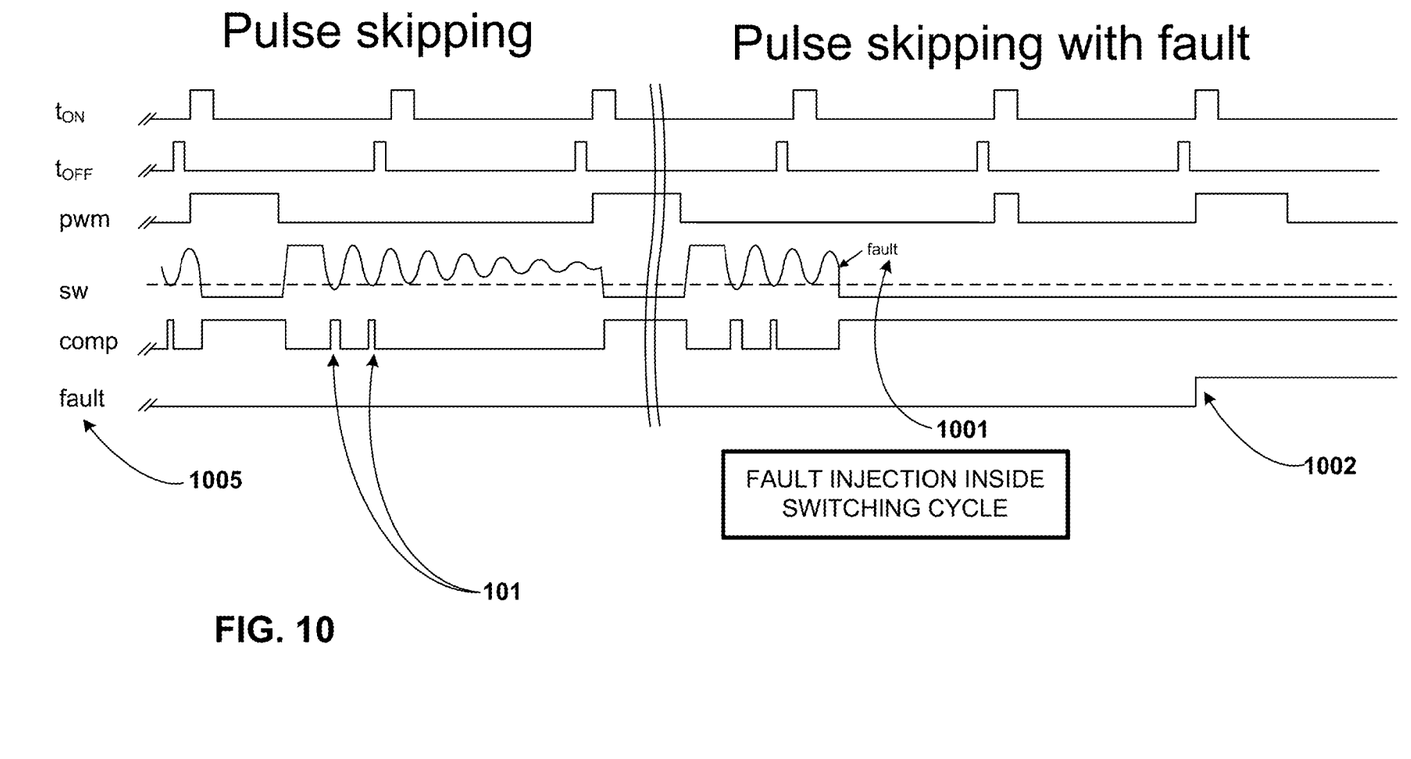

FIG. 10 illustrates signals during operation of a boost converter in pulse skipping mode in non-fault conditions (on the left) and pulse skipping mode in the presence of a fault that occurs inside of a switching cycle (on the right). On the left, whenever the comp signal is high (indicating a potential fault), the comp signal going high is attributable to the expectations caused by Ton, Toff, and PWM (except at points 101). At points 101, however, the comp signal going high is attributable to ringing on the inductor, which is expected in pulse skipping mode following the most recent PWM pulse. In this case, deglitch circuit 322 determines that the high comp signals at points 101 are attributable to ringing on the inductor and points 101 do not cause a fault signal even though the comp signal is high for part of the cycle. Moreover, in this case, since comp signal at points 101 does not remain high at the end of that switching cycle, no fault is determined based on signals at points 101. On the right, however, at the location of fault injection 1001, an actual fault is introduced at the inside of a switching cycle, which is not attributable to the expectations caused by Ton, Toff, and PWM and not attributable to ringing on an inductor. This is confirmed because the control signals Ton, Toff, and PWM then define at least one high-to-low transition within the next power converter cycle that occurs with a pre-defined period of time (e.g., a defined time period long enough to capture a next "non-skipped" power converter cycle). Thus, at point 1002, since the comp signal remains high, an actual fault signal 1005 is output by the filter circuit following the next complete switching cycle after the fault is introduced. In this case, the fault the power converter circuit satisfies the voltage threshold (as determined by comparator 320) and deglitch circuit 322 determines that the switch node voltage satisfying the threshold is not expected based on the control signals and not attributable to the situation of ringing on the inductor of the power converter circuit.

Figure 11:
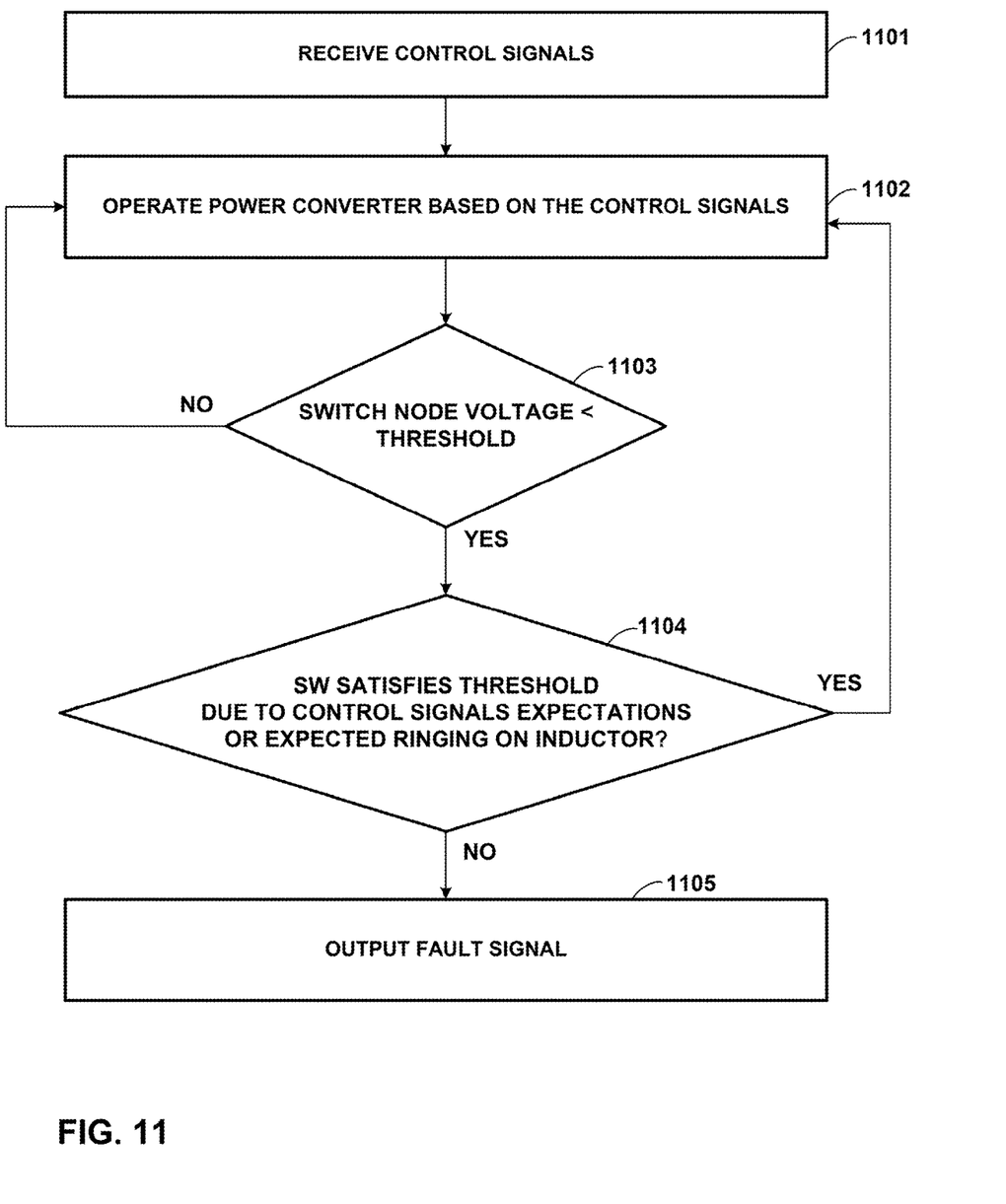
FIG. 11 is a flow diagram showing a method consistent with this disclosure.

FIG. 11 is a flow diagram showing a method consistent with this disclosure. As shown in FIG. 11, a power converter circuit 104 of FIG. 1 or the circuit of FIG. 2 receives control signals Ton, Toff (1101), e.g., as part of control loop 220. The power converter circuit operates the power converter based on the control signals (1102), e.g., generating PWM signals based on Ton and Toff and applying PWM signals to the gate of power switch 214. Comparator circuit 320 determines if a switch node voltage (SW) satisfies a voltage threshold (1103). In this example, comparator circuit 320 determines if the SW voltage is less than a threshold (e.g., Vref). Of course, logic signals could be inverted so that the comparisons to satisfy the threshold may correspond to less than the threshold (as illustrated in box 1103 of FIG. 11) or greater than Vref in other examples.

A smart filter 106, 206 (such as filter circuit 306 or the filter circuit shown in FIG. 4) may determine whether the switch node satisfying the threshold is due to control signal expectations or due to expected ringing on the inductor (1104). If the switch node satisfying the threshold is due to control signal expectations or due to expected ringing on the inductor (yes branch of 1104), then the power converter circuit continues to operate based on the control signals (1102). However, if the switch node satisfying the threshold is not due to control signal expectations or not due to expected ringing on the inductor (no branch of 1104), then smart filter 106, 206 outputs a fault signal for the power converter (1105). A processor, such as controller 102, may receive the fault signal and limit or disable operation of the power converter circuit in response to receiving the fault signal from smart filter 106, 206.

Again, as set forth above, in some examples, smart filter 106, 206 may be configured to determine that the switch node voltage satisfying the threshold is not expected based on the control signals and not attributable to the situation of ringing on the inductor of the power converter circuit by identifying whether certain conditions are satisfied. For example, in response to determining that the switch node voltage of the power converter circuit satisfies the voltage threshold, smart filter 106, 206 may be configured output the fault signal in response to at least one of the following conditions being satisfied:

(3) the control signals define at least one high-to-low transition within a power converter cycle, wherein the power converter cycle occurs with a pre-defined period of time; or (4) the control signals define a low state at a beginning of the power converter cycle.

The techniques described in this disclosure may be implemented, at least in part, in circuitry, hardware, software, firmware or any combination thereof. For example, various aspects of the described techniques may be implemented within one or more logical elements, processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components, or integrated within common or separate hardware or software components.

It may also be possible for one or more aspects of this disclosure to be performed in software, in which case those aspects of the techniques described in this disclosure may also be embodied or encoded in a computer-readable medium, such as a computer-readable storage medium, containing instructions. Instructions embedded or encoded in a computer-readable storage medium may cause a programmable processor, or other processor, to perform the method, e.g., when the instructions are executed. Computer readable storage media may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer readable media.

The following clauses may illustrate one or more aspects of the disclosure.

Clause 1—A filter circuit for a power converter circuit, the filter circuit comprising: a comparator circuit configured to determine when a switch node voltage of the power converter circuit satisfies a voltage threshold; and a deglitch circuit configured to determine whether the switch node voltage satisfying the threshold is expected based on control signals to the power converter circuit or attributable to a situation of ringing on an inductor of the power converter circuit, wherein the filter circuit is configured to output a fault in response to both the comparator circuit determining that the switch node voltage of the power converter circuit satisfies the voltage threshold and the deglitch circuit determining that the switch node voltage satisfying the threshold is not expected based on the control signals and not attributable to the situation of ringing on the inductor of the power converter circuit.

Clause 2—The filter circuit of clause 1, wherein the deglitch circuit includes a deglitch filter and a FSM, wherein the FSM is configured to output a fault signal in response to the comparator circuit determining that the switch node voltage of the power converter circuit satisfies the voltage threshold and the deglitch filter determining that the switch node voltage satisfying the threshold is not expected based on the control signals and is not attributable to the situation of ringing on the inductor of the power converter circuit.

Clause 3—The filter circuit of clause 2, wherein the FSM is configured to determine whether the switch node voltage satisfying the threshold is either attributable or not attributable to the situation of ringing on the inductor of the power converter circuit based on the control signals to the power converter circuit.

Clause 4—The filter circuit of any of clauses 1-3, wherein the control signals define either a first situation or a second situation, wherein ringing on the inductor is expected when the control signals define the first situation and wherein ringing on the inductor is not expected when the control signals define the second situation.

Clause 5—The filter circuit of any of clauses 1-4, wherein the control signals include ON and OFF signals that define PWM control signals for a power switch of the power converter circuit.

Clause 6—The filter circuit of any of clauses 1-5, wherein in response to the comparator circuit determining that the switch node voltage of the power converter circuit satisfies the voltage threshold, the FSM is configured output the fault signal in response to at least one of the following conditions being satisfied: the control signals define at least one high-to-low transition within a power converter cycle, wherein the power converter cycle occurs with a pre-defined period of time; or the control signals define a low state at a beginning of the power converter cycle.

Clause 7—A power converter circuit comprising: an LC circuit connected to a voltage source; a power switch, wherein an ON/OFF state of the power switch is controlled to define a switch node voltage at a switch node located within the LC circuit; and filter circuit for the power converter circuit, the filter circuit comprising: a comparator circuit configured to determine when the switch node voltage of the power converter circuit satisfies a voltage threshold; and a deglitch circuit configured to determine whether the switch node voltage satisfying the threshold is expected based on control signals to the power converter circuit or attributable to a situation of ringing on an inductor of the power converter circuit, wherein the filter circuit is configured to output a fault in response to both the comparator circuit determining that the switch node voltage of the power converter circuit satisfies the voltage threshold and the deglitch circuit determining that the switch node voltage satisfying the threshold is not expected based on the control signals and not attributable to the situation of ringing on the inductor of the power converter circuit.

Clause 8—The power converter circuit of clause 7, further comprising a microcontroller configured to send the control signals to the power switch.

Clause 9—The power converter circuit of clause 7 or 8, wherein the deglitch circuit includes a deglitch filter and a FSM, wherein the FSM is configured to output a fault signal in response to the comparator circuit determining that the switch node voltage of the power converter circuit satisfies the voltage threshold and the deglitch filter determining that the switch node voltage satisfying the threshold is not expected based on the control signals and is not attributable to the situation of ringing on the inductor of the power converter circuit.

Clause 10—The power converter circuit of clause 9, wherein the FSM is configured to determine whether the switch node voltage satisfying the threshold is either attributable or not attributable to the situation of ringing on the inductor of the LC circuit of the power converter circuit based on the control signals to the power converter circuit.

Clause 11—The power converter circuit of any of clauses 7-10, wherein the control signals define either a first situation or a second situation, wherein ringing on the inductor of the LC circuit is expected when the control signals define the first situation and wherein ringing on the inductor of the LC circuit is not expected when the control signals define the second situation.

Clause 12—The power converter circuit of any of clauses 7-11, wherein the control signals comprise ON and OFF signals that define PWM control signals for the power switch.

Clause 13—The power converter circuit of any of clauses 1-12, wherein in response to the comparator circuit determining that the switch node voltage of the power converter circuit satisfies the voltage threshold, the FSM is configured output the fault signal in response to at least one of the following conditions being satisfied: the control signals define at least one high-to-low transition within a power converter cycle, wherein the power converter cycle occurs with a pre-defined period of time; or the control signals define a low state at a beginning of the power converter cycle.

Clause 14—A method comprising: receiving control signals at a power converter circuit; operating the power converter circuit based on the control signals; determining when a switch node voltage of the power converter circuit satisfies a voltage threshold; determining whether the switch node voltage satisfying the threshold is attributable to a situation of ringing on an inductor of the power converter circuit; and outputting a fault associated with the power converter circuit in response to determining that the switch node voltage of the power converter circuit satisfies the voltage threshold and in response to determining that the switch node voltage satisfying the threshold is not expected based on the control signals and not attributable to the situation of ringing on the inductor of the power converter circuit.

Clause 15—The method of clause 14, further comprising: determining whether the switch node voltage satisfying the threshold is either attributable or not attributable to the situation of ringing on the inductor of the power converter circuit based on the control signals from a controller circuit to the power converter circuit.

Clause 16—The method of clause 14 or 15, wherein the control signals define either a first situation or a second situation, wherein ringing on the inductor of the LC circuit is expected when the control signals define the first situation and wherein ringing on the inductor of the LC circuit is not expected when the control signals define the second situation.

Clause 17—The method of any of clauses 14-16, further comprising: outputting the fault signal in response to the switch node voltage satisfying the threshold in combination with at least one of the following conditions being satisfied: the control signals define at least one high-to-low transition within a power converter cycle, wherein the power converter cycle occurs with a pre-defined period of time; or the control signals define a low state at a beginning of the power converter cycle.

Various aspects have been described in this disclosure. These and other aspects are within the scope of the following claims.

The invention claimed is:

1. A filter circuit for a power converter circuit, the filter circuit comprising:
  a comparator circuit configured to determine when a switch node voltage of the power converter circuit satisfies a voltage threshold; and
  a deglitch circuit configured to determine whether the switch node voltage satisfying the threshold is expected based on control signals to the power converter circuit or attributable to a situation of ringing on an inductor of the power converter circuit,
  wherein the filter circuit is configured to output a fault in response to both the comparator circuit determining that the switch node voltage of the power converter circuit satisfies the voltage threshold and the deglitch circuit determining that the switch node voltage satisfying the threshold is not expected based on the control signals and not attributable to the situation of ringing on the inductor of the power converter circuit.

2. The filter circuit of claim 1, wherein the deglitch circuit includes a deglitch filter and a finite state machine (FSM), wherein the FSM is configured to output a fault signal in response to the comparator circuit determining that the switch node voltage of the power converter circuit satisfies the voltage threshold and the deglitch filter determining that the switch node voltage satisfying the threshold is not expected based on the control signals and is not attributable to the situation of ringing on the inductor of the power converter circuit.

3. The filter circuit of claim 2, wherein the FSM is configured to determine whether the switch node voltage satisfying the threshold is either attributable or not attributable to the situation of ringing on the inductor of the power converter circuit based on the control signals to the power converter circuit.

4. The filter circuit of claim 3, wherein the control signals define either a first situation or a second situation, wherein ringing on the inductor is expected when the control signals define the first situation and wherein ringing on the inductor is not expected when the control signals define the second situation.

5. The filter circuit of claim 1, wherein the control signals include ON and OFF signals that define pulse width modulation (PWM) control signals for a power switch of the power converter circuit.

6. The filter circuit of claim 3, wherein in response to the comparator circuit determining that the switch node voltage of the power converter circuit satisfies the voltage threshold, the FSM is configured output the fault signal in response to at least one of the following conditions being satisfied:
  the control signals define at least one high-to-low transition within a power converter cycle, wherein the power converter cycle occurs with a pre-defined period of time; or
  the control signals define a low state at a beginning of the power converter cycle.

7. A power converter circuit comprising:
  an inductor-capacitor (LC) circuit connected to a voltage source;
  a power switch, wherein an ON/OFF state of the power switch is controlled to define a switch node voltage at a switch node located within the LC circuit; and
  filter circuit for the power converter circuit, the filter circuit comprising:
  a comparator circuit configured to determine when the switch node voltage of the power converter circuit satisfies a voltage threshold; and
  a deglitch circuit configured to determine whether the switch node voltage satisfying the threshold is expected based on control signals to the power converter circuit or attributable to a situation of ringing on an inductor of the power converter circuit,
  wherein the filter circuit is configured to output a fault in response to both the comparator circuit determining that the switch node voltage of the power converter circuit satisfies the voltage threshold and the deglitch circuit determining that the switch node voltage satisfying the threshold is not expected based on the control signals and not attributable to the situation of ringing on the inductor of the power converter circuit.

8. The power converter circuit of claim 7, further comprising a microcontroller configured to send the control signals to the power switch.

9. The power converter circuit of claim 7, wherein the deglitch circuit includes a deglitch filter and a finite state machine (FSM), wherein the FSM is configured to output a fault signal in response to the comparator circuit determining that the switch node voltage of the power converter circuit satisfies the voltage threshold and the deglitch filter determining that the switch node voltage satisfying the threshold is not expected based on the control signals and is not attributable to the situation of ringing on the inductor of the power converter circuit.

10. The power converter circuit of claim 9, wherein the FSM is configured to determine whether the switch node voltage satisfying the threshold is either attributable or not attributable to the situation of ringing on the inductor of the LC circuit of the power converter circuit based on the control signals to the power converter circuit.

11. The power converter circuit of claim 10, wherein the control signals define either a first situation or a second situation, wherein ringing on the inductor of the LC circuit is expected when the control signals define the first situation and wherein ringing on the inductor of the LC circuit is not expected when the control signals define the second situation.

12. The power converter circuit of claim 7, wherein the control signals comprise ON and OFF signals that define pulse width modulation (PWM) control signals for the power switch.

13. The power converter circuit of claim 10, wherein in response to the comparator circuit determining that the switch node voltage of the power converter circuit satisfies the voltage threshold, the FSM is configured output the fault signal in response to at least one of the following conditions being satisfied:
the control signals define at least one high-to-low transition within a power converter cycle, wherein the power converter cycle occurs with a pre-defined period of time; or
the control signals define a low state at a beginning of the power converter cycle.

14. A method comprising:
receiving control signals at a power converter circuit;
operating the power converter circuit based on the control signals;
determining when a switch node voltage of the power converter circuit satisfies a voltage threshold;
determining whether the switch node voltage satisfying the threshold is attributable to a situation of ringing on an inductor of the power converter circuit; and
outputting a fault associated with the power converter circuit in response to determining that the switch node voltage of the power converter circuit satisfies the voltage threshold and in response to determining that the switch node voltage satisfying the threshold is not expected based on the control signals and not attributable to the situation of ringing on the inductor of the power converter circuit.

15. The method of claim 14, further comprising:
determining whether the switch node voltage satisfying the threshold is either attributable or not attributable to the situation of ringing on the inductor of the power converter circuit based on the control signals from a controller circuit to the power converter circuit.

16. The method of claim 15, wherein the control signals define either a first situation or a second situation, wherein ringing on the inductor of the LC circuit is expected when the control signals define the first situation and wherein ringing on the inductor of the LC circuit is not expected when the control signals define the second situation.

17. The method of claim 15, further comprising:
outputting the fault signal in response to the switch node voltage satisfying the threshold in combination with at least one of the following conditions being satisfied:
the control signals define at least one high-to-low transition within a power converter cycle, wherein the power converter cycle occurs with a pre-defined period of time; or
the control signals define a low state at a beginning of the power converter cycle.

* * * * *